M. J. WOLFF.
COMBINED TRIMMING AND NESTING MACHINE FOR ICE CREAM CORNUCOPIAS.
APPLICATION FILED SEPT. 2, 1919.
1,344,286.
Patented June 22, 1920.
3 SHEETS—SHEET 1.
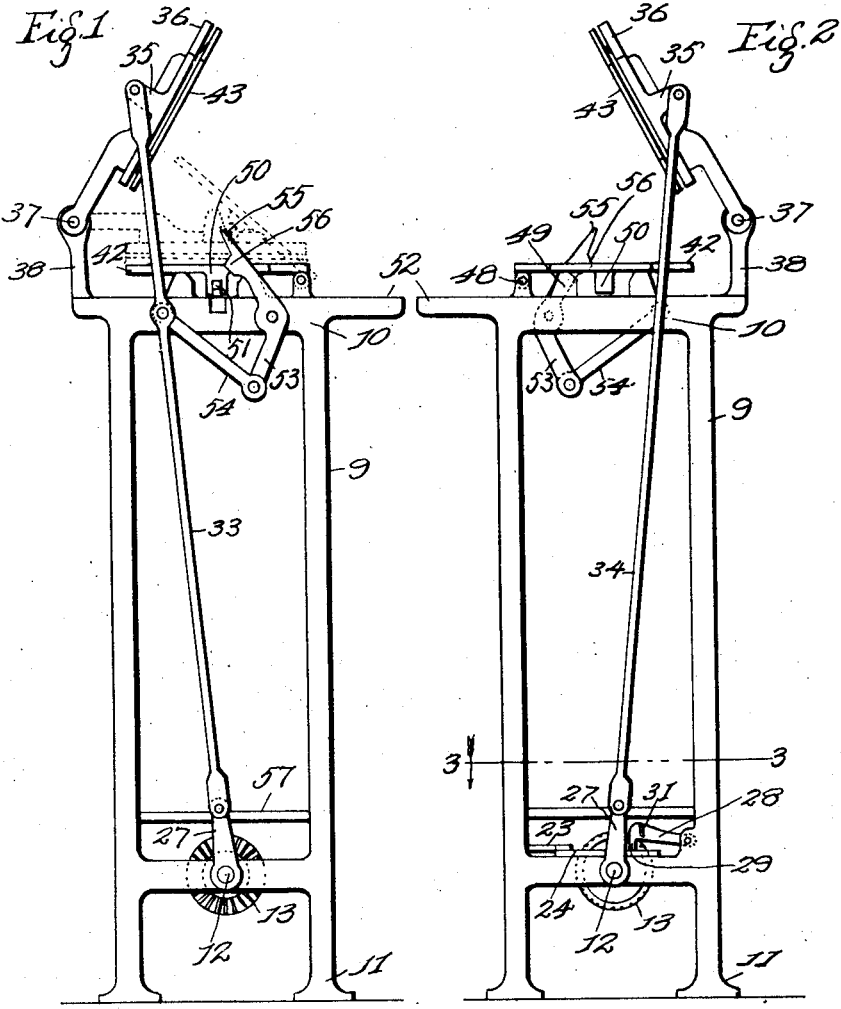
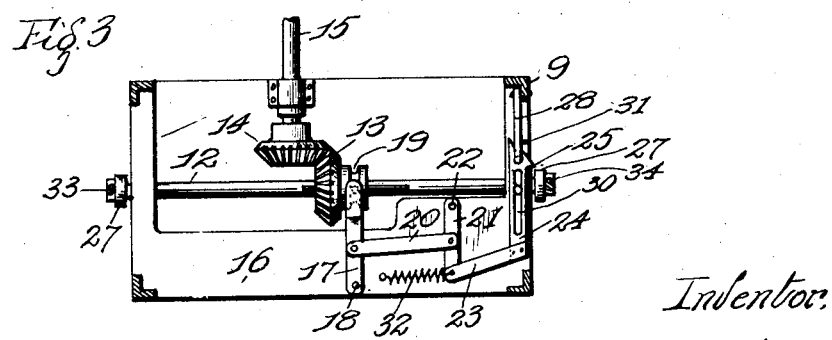
Inventor:
Michael J. Wolff M. J. WOLFF.
COMBINED TRIMMING AND NESTING MACHINE FOR ICE CREAM CORNUCOPIAS.
APPLICATION FILED SEPT. 2, 1919.
1,344,286.
Patented June 22, 1920.
3 SHEETS—SHEET 2.
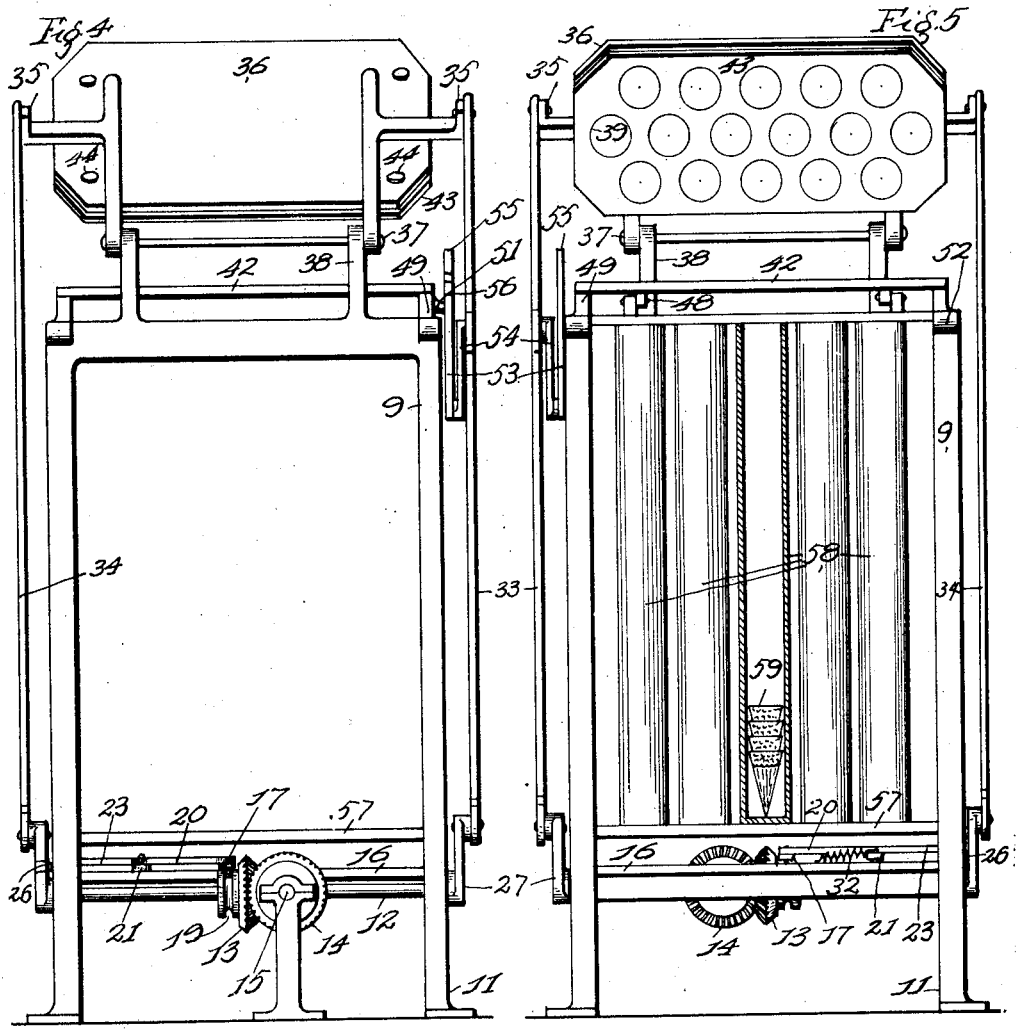
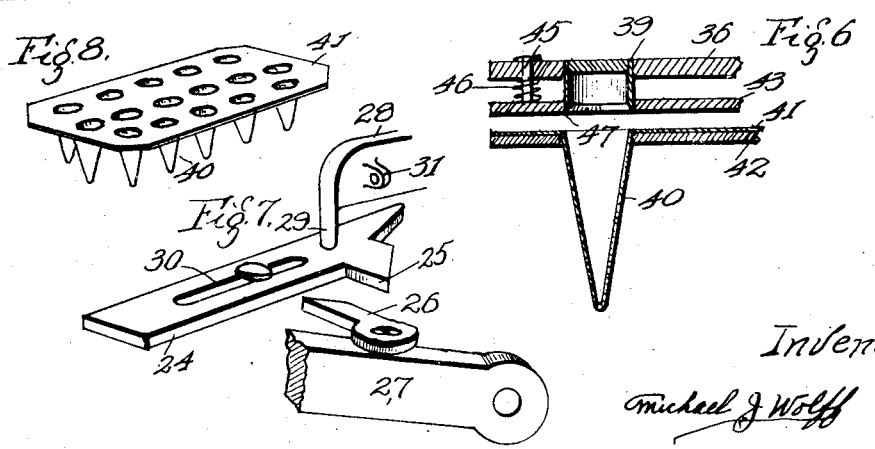
Inventor.
Michael J. Wolff M. J. WOLFF.
COMBINED TRIMMING AND NESTING MACHINE FOR ICE CREAM CORNUCOPIAS.
APPLICATION FILED SEPT. 2, 1919.
1,344,286.
Patented June 22, 1920.
3 SHEETS—SHEET 3.
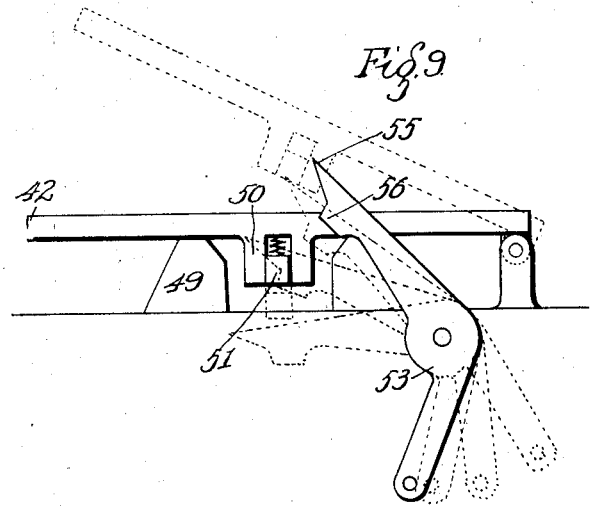
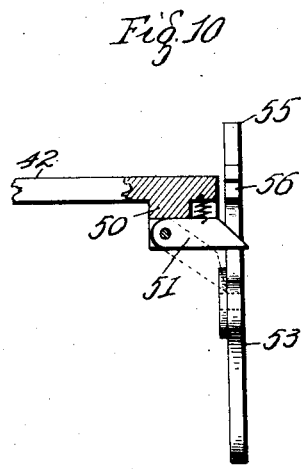
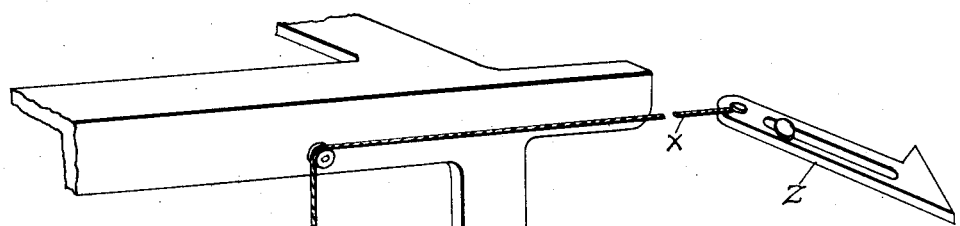
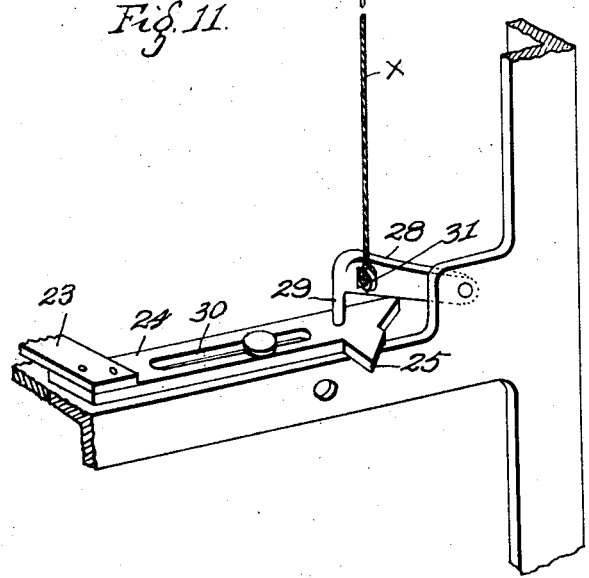
Inventor
Michael J Wolff

UNITED STATES PATENT OFFICE.

MICHAEL J. WOLFF, OF ST. LOUIS, MISSOURI.

COMBINED TRIMMING AND NESTING MACHINE FOR ICE-CREAM CORNUCOPIAS.

1,344,286.  Specification of Letters Patent.  Patented June 22, 1920.

Application filed September 2, 1919. Serial No. 321,062.

*To all whom it may concern:*

Be it known that I, MICHAEL J. WOLFF, a citizen of the United States, and resident of St. Louis, Missouri, have invented certain new and useful Improvements in Combined Trimming and Nesting Machines for Ice-Cream Cornucopias, of which the following is a specification.

This invention relates to improvements in a combined trimming and nesting machine for ice cream cornucopias, and has for its object a mechanism in which the baked cornucopia when removed from the baking form and placed in the machine are trimmed and permitted by their own gravity to nest themselves in receiving compartments placed beneath the trimming table.

A further object of my invention is to construct a machine which is arranged with a plurality of circular dies or trimming knives which removes the cornucopia from the connecting wall of the same material from which the cornucopia are baked and to permit the trimmed cornucopia to nest themselves in suitable compartments located beneath the trimming table and in relative position with the trimming knives. This invention is used in conjunction with a rotary automatic cornucopia baking machine on which I have filed application for patent on May 26th, 1919, Serial No. 299,855.

A further object of my invention is to place the trimming machine in close proximity with the baking machine and when the cakes after being trimmed are removed from the baking forms they are inserted in the table of the trimming machine and at the proper period the machine is placed in operation and trims the cornucopia or cones from the connecting layer; and also at a given period after the trimming process the layer trimmed from the cornucopia is automatically removed from the trimming table and delivered into a suitable conveyer or compartment attached or otherwise suspended to the machine in front of the table.

Figure 1, is a side view of my invention.

Fig. 2, is a view of the opposite side of my invention.

Fig. 3, is a horizontal sectional view taken on the line 3—3 of Fig. 2.

Fig. 4, is a rear view.

Fig. 5, is a front view.

Fig. 6, is a detail sectional view of a portion of the trimming and cutting table showing the general structure.

Fig. 7, is a detail perspective view of a portion of the operating mechanism by which the clutch is thrown in and out of gear.

Fig. 8, is a detail perspective view of a series of the baked cornucopias after having been removed from the baking form.

Fig. 9 is a detail view showing the trimming table and its operating lever in various operative positions.

Fig. 10, is a side view of the same with a part in section showing the latch.

Fig. 11, is a detail sectional perspective view of a portion of the frame and the position of the dog carried thereby.

The general construction of my invention consists of a suitable frame comprising vertical standards 9, an outer frame 10 and supporting legs 11. In the frame near the bottom is supported a shaft 12 on which is keyed and slidably mounted a gear 13 which is arranged to mesh with the gear 14 mounted on the shaft 15 and which shaft is driven by the manipulation of the rotary automatic cornucopia baking machine as disclosed in the application filed by me May 26th, 1919.

In close proximity with the gear 13 and located in the frame is a suitable horizontal partition 16 on which is mounted a lever mechanism for manipulating the gear 13 placing it in and out of mesh. This lever mechanism consists of a lever 17 pivoted to the partition at the point indicated by the numeral 18, its opposite end being bifurcated and fitting around a collar 19 attached to the gear. To the lever 17 is pivotally connected a cross arm 20 which is pivoted to a lever 21 pivoted to the partition at the point indicated by the numeral 22, and to the free end of the lever is attached an arm 23. Its opposite end is connected rigidly to a toothed slotted sliding bar 24, its tooth 25 being arranged to project a suitable distance beyond the edge of the frame in order that the dog or projection 26 formed on one of the crank arms 27 may contact therewith and push the bar rearwardly thereby operating the lever mechanism and releasing the gear 13 from its meshed position with the gear 14 thus stopping the operation of the trimming machine.

On one of the standards 9 is located a dog 28 which is provided with a tooth 29 of such size as to automatically fall into the slot 30 formed in the bar 24 and its purpose is to hold the lever mechanism in its in-operative position until the dog is released by means of a cord or cable X attached to the projecting lug 31 formed on the dog 28.

This cable or cord X is attached to a certain dog Z located on the baking machine which is to operate in conjunction with this trimming and nesting machine and on which an application for patent is now pending, bearing Serial No. 299,855, and this dog as shown on the baking machine application is indicated by the numeral 109 and by the movement of the machine frame tension is brought on the cord at the proper period to raise the dog out of the slot and by means of the spring 32 the lever mechanism is automatically returned to its normal position bringing the gear 13 in mesh with the gear 14.

To both ends of the shaft 12 are attached crank arms 27 and to these arms are attached connecting rods 33 and 34, the opposite ends of both of these connecting rods are attached to the brackets 35 which are attached to and form a part of the top plate 36 of the cutting table and said brackets are so arranged as to be hingedly mounted at the point indicated by the numeral 37 to projections 38 extending upwardly from the rear of the frame.

To the plate 36 is attached a plurality of circular dies or cutting knives 39. These cutting knives are of such diameter and shape and so sharpened as to cleanly cut the cones or cornucopia 40 from their connecting web 41, and in order to properly support the web in position on the trimming table 42 and for holding the web in rigid position so as to prevent breakage of the cones or cornucopia I provide a spring actuated plate 43 supported on the plate 36, preferably at four points indicated by the numeral 44 and consisting of pins 45 attached to the plate 43 and extending through the plate 36 and around the pins and between both of said plates are expansive springs 46. These springs have a tendency to hold the two plates spread apart and keep the plate 43 a slight distance beyond the cutting edge 47 of the dies or knives 39.

This plate 43 in addition to supporting the web 41 also acts in the capacity as a removing plate in the event any portion of the baked cake should adhere to the knife.

The trimming plate 43 in which the baked cake is supported for the cutting process is hingedly mounted on the frame at the point indicated by the numeral 48 and is supported on suitable lugs 49 extending upwardly from the sides of the frame and this plate is likewise provided with a plurality of openings to permit the insertion of the various cones or cornucopia which extend from the connecting web.

On one side of the trimming table 42 is a downwardly projecting extension 50 which is provided with a spring controlled latch 51, this latch is so arranged as to be rigid when pressure is exerted on the under side thereof and is for the purpose to permit the trimming table 42 to be tilted on its hinges in a position as that shown by dotted lines in Figs. 1 and 9.

This tilted position is for the purpose of permitting the web after the cones have been trimmed therefrom to automatically by their own gravity slide off of the plate and into a container or conveyer supported on the front arms 52 of the frame.

In order to operate the trimming plate in a manner as just previously described I pivotally attach to one side of the frame a lever 53 to which is connected a connecting arm 54 and which arm is pivotally attached to the connecting rod 33.

The lever 53 is so shaped and arranged that during the upward movement of the connecting rod 33 the free end 55 of the lever 53 will contact with the upper surface of the latch 51 and raise the plate in a tilted position until the point of the lever 53 passes beyond the latch when the table will return by its own gravity to its horizontal position and the latch 51 is so shaped and so arranged as to permit the lever 53 to return to its normal lower position when the tooth 56 of the lever contacts with the inclined surface of the latch and compresses the same as shown by dotted lines in Fig. 10 thereby permitting the lever 53 to again perform its operation during the manipulation of the machine, the various positions assumed by the lever being illustrated by dotted lines in Fig. 9.

In the frame I provide a suitable table 57, on this table I place a suitable container or box which is provided with a plurality of cylinders 58 which cylinders are arranged in numbers and of a size corresponding with the number and size of the cylinder suspended in the trimming table, and when the knife pressure is brought in contact with the crank and the cones severed from the web the cones by their own gravity will automatically fall into the cylinders 58 and nest themselves as shown by the numeral 59 in Fig. 5.

After these cylinders have been filled with cones they are removed and new cylinders placed in position on the table.

The essential feature is to construct a machine which will sever the cones or cornucopia from the connecting web which is formed by the material from which the cones are baked and as shown in the illustration 16 cones are baked out of one batter and are each connected together by the web and these cones are simultaneously separated from the web by the downward action of the knives which are brought in contact therewith.

Having fully described my invention what I claim is:

1. A machine of the character described comprising a frame, a perforated trimming table hingedly mounted on the frame, a cutting means hingedly mounted on the frame and arranged to be brought in contact with the trimming table, an operating mechanism for raising and lowering the trimming mechanism and a lever mechanism operated in conjunction with the movement of the cutting mechanism for tilting the trimming table at a given period for removing the trimmed web therefrom, substantially as specified.

2. A machine of the character described comprising a frame, a perforated trimming table hingedly mounted on the frame and arranged to permit the insertion of a series of baked cornucopias, a hinged plate provided with a corresponding number of cutters arranged to be brought in contact with the trimming table for severing the cones from the web, a spring actuated pressure plate carried by the cutters for contacting with the web before the same is severed by the cutters, an actuating mechanism for raising and lowering the cutter plate, an actuating lever for tilting the trimmer plate and a clutch mechanism for placing the machine in and out of operation at a given period, substantially as specified.

3. A machine of the character described comprising a frame, a hinged perforated trimming table in which is inserted the baked cornucopias, a cutter supporting plate hingedly mounted on the frame, connecting rods controlling the movement of the cutter supporting plate, a plurality of cutters carried by the plate and arranged in conformity with the position of the cornucopias supported in the trimmer table, a tension plate carried by the cutter supporting plate for contacting with the joining web of the cornucopias and for removing the web from the cutters after the cutting process, a lever for tilting the trimmer table to automatically remove the separated web, a gear mechanism for operating the connecting rods and a lever mechanism for placing the gear in and out of operation at a given period, substantially as specified.

4. A machine of the character described comprising a frame, a hinged perforated trimming table in which is inserted the baked cornucopias, a cutter supporting plate hingedly mounted on the frame, connecting rods controlling the movement of the cutter supporting plate, a plurality of cutters carried by the plate and arranged in conformity with the position of the cornucopias supported in the trimmer table, a tension plate carried by the cutter supporting plate for contacting with the joining web of the cornucopias and for removing the web from the cutters after the cutting process, a lever for tilting the trimmer table to automatically remove the separated web, a gear mechanism for operating the connecting rods, a lever mechanism for placing the gear in and out of operation at a given period and a table supported in the frame and containers supported on the table for nesting the severed cornucopias, substantially as specified.

5. A machine of the character described comprising a frame having a perforated plate for the reception of a series of baked cornucopias, a plurality of cutters arranged to be brought in contact with the same for separating the cornucopias from the web, a means for tilting the plate for removing the severed web, a means for raising and lowering the cutter supporting plate at a given period so as to replace a new series of baked cornucopias, a container for receiving and nesting the severed cornucopias and a means for automatically controlling the starting and stopping of the machine, substantially as specified.

In testimony whereof I have signed my name to this specification in presence of two subscribing witnesses.

MICHAEL J. WOLFF.

Witnesses:
ALFRED A. EICKS,
B. N. AUSTINE.